United States Patent [19]

Perkins et al.

[11] Patent Number: 4,937,042

[45] Date of Patent: Jun. 26, 1990

[54] METHOD FOR MAKING AN ABRADABLE ARTICLE

[75] Inventors: Roger J. Perkins, Evendale; Murray S. Smith, Jr., Green Hills, both of Ohio

[73] Assignee: General Electric Company, Cincinnati, Ohio

[21] Appl. No.: 327,865

[22] Filed: Mar. 23, 1989

Related U.S. Application Data

[62] Division of Ser. No. 935,997, Nov. 28, 1986, Pat. No. 4,842,953.

[51] Int. Cl.$^5$ .................................................. B22F 7/00
[52] U.S. Cl. .................................................. 419/8; 419/36; 419/37; 419/38; 419/47; 419/54; 419/57
[58] Field of Search ................. 419/8, 38, 36, 37, 57, 419/47, 54; 75/246

[56] References Cited

U.S. PATENT DOCUMENTS

| | | | |
|---|---|---|---|
| 3,073,269 | 1/1983 | Hoppin et al. | 113/110 |
| 3,155,491 | 11/1964 | Hoppin et al. | 75/0.5 |
| 3,342,563 | 9/1967 | Butts | 29/182 |
| 3,383,207 | 5/1968 | Butts | 75/212 |
| 3,676,085 | 2/1971 | Evans et al. | 29/194 |
| 3,928,026 | 12/1975 | Hecht et al. | 75/134 |
| 4,022,587 | 5/1977 | Wlodek | 75/171 |
| 4,034,142 | 7/1977 | Hecht | 428/678 |
| 4,093,454 | 6/1978 | Saito | 75/236 |
| 4,381,944 | 5/1983 | Smith, Jr. et al. | 75/246 |
| 4,494,988 | 1/1985 | Schumacher et al. | 420/73 |
| 4,497,669 | 2/1985 | Wang et al. | 75/246 |
| 4,613,368 | 9/1986 | Chang et al. | 75/246 |
| 4,614,296 | 9/1986 | Lesgourgues | 228/194 |
| 4,676,829 | 6/1987 | Chang et al. | 75/246 |

Primary Examiner—Stephen J. Lechert, Jr.
Assistant Examiner—Nina Bhat
Attorney, Agent, or Firm—Jerome C. Squillaro; Stephen S. Strunck; Carmen Santa Maria

[57] ABSTRACT

A mixture of two powdered alloys of the M, Cr, Al type, M being Co and/or Ni, is disclosed, in one form, for use in providing an abradable surface of an article and is characterized by the substantial absence of B. The first alloy has substantially no Si and has a higher melting range than that of the second alloy. The second alloy has substantially no Y and consists essentially of, by weight, 8–12% Si, 1.5–4% Al, 10–30%Cr, with the balance M and incidental impurities. The total mixture composition consists essentially of, by weight, 10–35% Cr, 4–10% Al, from a small but effective amount up to about 0.09% Y, 2–6% Si, with the balance M and incidental impurities.

11 Claims, 1 Drawing Sheet

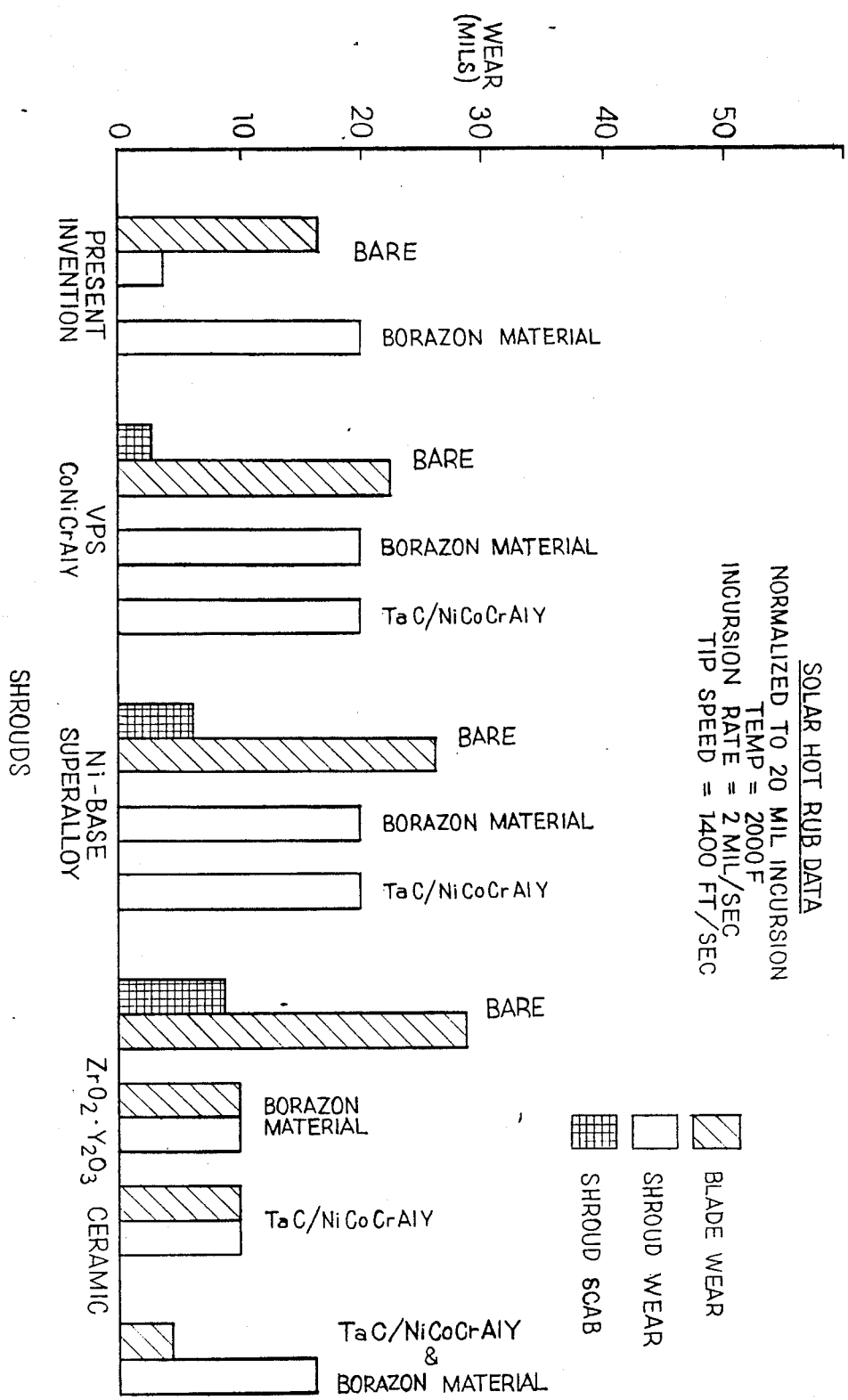

METHOD FOR MAKING AN ABRADABLE ARTICLE

This is a division of application Ser. No. 935,997, filed Nov. 28, 1986, now U.S. Pat. No. 4,842,953.

BACKGROUND OF THE INVENTION

This invention relates to articles having an abradable surface portion and, more particularly, to turbomachinery high temperature superalloy articles having an abradable surface portion.

Gas turbine engine efficiency depends, at least in part, on reduction and preferably elimination of gas stream leakage between stationary and rotating members. For example, in the hot operating turbine portions of the engine, a gaseous stream of products of combustion are expanded through rotating turbine blades which cooperate with an opposed stationary shroud in a sealing relationship. Leakage around such a seal can reduce the effective extraction of energy from the gaseous stream. Abradable sealing means for such an application has included use on the shroud of various porous or fibrous metallic or non-metallic abradable materials. During operation, rotating turbine blade tips and the abradable sealing means generally approach one another into an interference relationship to avoid leadage outside of the gaseous stream.

As the operating temperatures and conditions in a gas turbine engine have become more strenuous, the known porous or fibrous abradable materials have experienced excessive oxidation or erosion or both.

SUMMARY OF THE INVENTION

One object of the present invention is to provide an article with an improved abradable surface portion such as for high temperature sealing operation.

Another object is to provide a mixture of powdered alloys which can be used in making such an article surface portion.

Still another object is to provide a method of making such an article.

A further object is to provide an improved powdered alloy useful for brazing as well as in the mixture of this invention.

These and other objects and advantages will be more fully understood from the following detailed description of the preferred embodiments and the drawing, all of which are intended to be typical of, rather than in any way limiting on, the scope of the present invention.

Briefly, one form of the present invention provides a mixture of two powdered alloys, each comprising a base of elements M, Cr and Al, in which M is at least one element selected from Co and Ni. Sometimes these types of alloys are referred to as "MCrAl" or "McrAlY" alloys. The mixture has a total mixture composition essentially of, by weight, 10–35% Cr, 4–10% Al, from a small but effective amount up about 0.09% Y, 2–6% Si, with balance M and incidental impurities, and further characterized by the substantial absence of B. A first of the two powdered alloys consists of 50–70 wt% of the mixture and has a melting range higher than a second of the powdered alloys. The first alloy is characterized by the substantial absence of Si and the presence of Y in an amount, up to 0.15 weight percent, which will provide the specified Y content in the total mixture composition. The second of the two powdered alloys, which consists essentially of the balance of the mixture, is characterized by the substantial absence of Y and consists essentially of, by weight, 8–12% Si, 1.5–4% Al, 10–30% Cr, with the balance M and incidental impurities.

The present invention in an additional form provides an improved brazing alloy characterized by the substantial absence of Y and consisting essentially of, by weight 8–12% Si, 1.5–4% Al, 10–30% Cr with the balance at least one element selected from Co and Ni, along with incidental impurities.

In another form of the present invention, there is provided an article which includes an environmentally resistant, abradable surface portion comprising an inner portion of a superalloy selected from Co-base and Ni-base superalloys and an outer portion metallurgically bonded with the inner portion, and consolidated and liquid phase sintered from the mixture of two powdered alloys of the present invention. The outer portion has a thickness in the range of at least about 0.05 up to about 0.2 inch.

The invention in still another form provides a method for making such an article, including the steps of disposing the powder mixture on a surface of the article, for example as a powder or as a compacted preform, and then heating the powder mixture and the surface in a non-oxidizing atmosphere at a temperature above the liquidus temperature of the lower melting alloy powder of the mixture and below the liquidus temperature of the higher melting alloy powder.

BRIEF DESCRIPTION OF DRAWING

The drawing is a graphical comparison of hot rub data for the present invention with that of other systems.

DESCRIPTION OF THE PREFERRED EMBODIMENTS

Such U.S. Pat. Nos. as 3,073,269 and 3,155,491, both Hoppin III, et al., are representative of the prior knowledge that a relatively high temperature melting component of a powdered mixture can be combined with a lower temperature melting component for the purpose of creating a sintered structure. In the examples of such patents, the structure was in a form of a wide gap brazing mixture. In addition, over the years, improvements were made in the environmental resistance of high temperature alloys used primarily as coatings and sometimes referred to as MCrAlY type alloys.

Prior information relating to high temperature abradable seals for use in the high temperature operating portion of gas turbine engine expresses the need for a low density material to provide improved abradability. However, high density materials have been required for oxidation and erosion resistance in such use. The present invention, unlike the prior materials and structures, provides an improved product which is high in density as well as high in oxidation and erosion resistance, and yet has good abradability. In addition, it has the capability of being applied and bonded to the surface of currently used turbine alloys.

During the evaluation of the present invention, a variety of powdered alloys and their mixtures were studied. The following tables are representative of such powders and mixtures.

TABLE I

HIGHER MEETING RANGE ALLOYS
(wt % plus incidental impurities)

| Example | Co | Ni | Cr | Al | Y | Si | Solidus | Liquidus |
|---|---|---|---|---|---|---|---|---|
| 201 | Bal | 16.8 | 24.9 | 9.9 | 0.07 | 0 | 1374 | 1414 |
| KR839 | Bal | 32.7 | 21.8 | 8.9 | 0.13 | 0 | | |
| Al8060 | Bal | 30 | 22 | 8 | 0.06 | 0 | 1356 | 1373 |

TABLE II

LOWER MELTING RANGE ALLOYS
(wt % plus incidental impurities)

| Example | Co | Ni | Cr | Al | Y | Si | Solidus | Liquidus |
|---|---|---|---|---|---|---|---|---|
| 202 | 18.0 | Bal | 18.2 | 2.7 | 0 | 8.0 | 1091 | 1230 |
| 203 | 17.6 | Bal | 18.0 | 2.2 | 0 | 10.2 | 1097 | 1135 |
| 204 | 27.5 | Bal | 19.1 | 3.9 | 0 | 10.1 | 1117 | 1199 |
| 6 | 27.6 | Bal | 19.5 | 0 | 0 | 10 | 1118 | 1229 |
| 1 | 26.7 | Bal | 19 | 2.3 | 0 | 10 | 1103 | 1157 |
| 4 | 26.3 | Bal | 18.4 | 4.6 | 0 | 10 | 1121 | 1230 |
| 5 | 25.6 | Bal | 17.9 | 6.9 | 0 | 10 | 1146 | 1329 |

TABLE III

POWDER MIXTURES
(total % plus incidental impurities)

| Example | 67% High | 33% Low | Co | Ni | Cr | Al | Y | Si |
|---|---|---|---|---|---|---|---|---|
| A | 201 | 202 | Bal | 28.7 | 22.7 | 7.4 | 0.05 | 2.6 |
| B | 201 | 203 | Bal | 28.3 | 22.6 | 7.3 | 0.05 | 3.4 |
| C | KR839 | 204 | Bal | 34.9 | 20.9 | 7.3 | 0.09 | 3.3 |
| D | 201 | 204 | Bal | 24.2 | 23.0 | 7.8 | 0.05 | 3.3 |
| E | Al8060 | 204 | Bal | 33.3 | 21.0 | 6.7 | 0.04 | 3.3 |

TABLE IV

| MIXTURE EXAMPLE | MIXTURE/PROCESSING SOLIDUS (°C.) | LIQUIDUS (°C.) |
|---|---|---|
| A | 1293 | 1337 |
| B | 1272 | 1354 |
| C | 1275 | 1357 |
| D | 1283 | 1380 |
| E | 1268 | 1325 |

In the Tables herein, solidus and liquidus temperatures were determined by Differential Thermal Analysis (DTA).

The alloys of Table I are typical of those powdered alloys useful within the mixture of the present invention and characterized as having a melting range higher than the other powdered alloy of the present invention. Such higher melting range alloy is sometimes referred to as a first of the mixture of two powdered alloys of the present invention. Further, it is characterized by the substantial absence of Si and the presence Y in an amount which provides the specified Y content in the total mixture composition.

Table II presents typical alloys evaluated in connection with the present invention. Table II includes those alloys identified as the second of the powdered alloys of the mixture of the present invention, sometimes referred to as the lower melting range alloys. The second of the powdered alloys of the present invention is characterized by the substantial absence of Y and the presence of Si within the range of 8-12 wt%, along with about 1.5-4 wt% Al, 10-30 wt% Cr with the balance of elements selected from Co and Ni, along with incidental impurities.

Table III and IV identify powdered mixtures of certain of the alloys of Tables I and II and having a total mixture composition within the scope of the mixture of the present invention, and their liquidus and solidus temperatures. They consist essentially of, by weight, 10-35% Cr, 4-10% Al, from a small but effective amount up to about 0.1% Y, 2-6% Si with the balance at least one element selected from Co and Ni, along with incidental impurities. The mixture is further characterized by the substantial absence of B. In the mixture of the present invention, and in the two powdered alloys which comprise such mixture, B is specifically avoided and is not intentionally added to either alloy of the mixture of the present invention because it has found to be too detrimental to the oxidation resistance of the present invention, even though it commonly is used as a melting point depressant in brazing and coating alloys.

The mixture of the present invention defines a careful, critical balance between the elements Al, Si and Y. This balance takes into consideration and recognizes the requirements of maintaining a difference in the liquidus temperatures of the higher and lower melting powders of the mixture to enable processing into the article of the present invention. At the same time, the balance of all elements in the total mixture composition provides, in the abradable surface portion of the article, are improved combination of mechanical properties, abradability and resistance to erosion, corrosion and oxidation.

Al is included within the range of about 1.5-4 wt% to assist in melting point control and to improve oxidation resistance, acting as a getter along with Y. It has been found that inclusion of Al above and below that range results in insufficient melting of the lower melting alloy in the mixture of the present invention. In addition, above about 4 wt% Al tends to render the liquid alloy unduly sensitive to oxygen in the furnace/processing atmosphere, to embrittle the resultant alloy and to provide an alloy difficult to melt and flow during processing.

Si functions primarily as a melting point depressant and is included only in the lower melting range alloy of the mixture of the present invention. However, too much Si, about 12 wt% in the lower melting alloy and above 6% in the final mixture, results in too low a melting point in the finished material and increases the brittleness. Therefore, Si is included in a lower melting point powder in the range of 8-12 wt% to provide 2-6 wt% in the final mixture.

Y, which is included only in the higher melting range alloy of the mixture of the present invention, is a critical element to control the amount of Y in the final product at up to 0.1 wt%. It is well known that Y contributes to the corrosion and oxidation of MCrAlY alloys, and the presence of Y in the final product of the present invention achieves these objectives. However, if the amount of Y in the higher melting alloy exceeds about 0.15 wt%, consolidation becomes less reliable because wetting of the higher melting powder particles by the lower melting liquid becomes more difficult. In addition, excess Y renders the final product vulnerable to incipient melting and more reactive to the environment during handling and processing.

In the preferred form of the present invention, Cr and both elements Co and Ni are included as a base. The element Cr is provided both in the higher melting and lower melting range alloys to provide the powdered mixture with a composition in the range of about 10-35 wt%. Cr, which partitions to the gamma phase—the continuous phase of the gamma-beta system—is provided for oxidation resistance. In excess of about 35 wt% Cr results in a brittle structure which has poor resistance to thermal fatigue. Less than about 10 wt% Cr is insufficient to provide desired oxidation resistance. Therefore, the total mixture composition includes Cr in a range of about 10–35 wt%, with 10–30% in the lower melting component and preferably 20–25% Cr in the higher melting alloy.

Oxidation resistance of the abradable surface portion of the article of the present invention was screened at 2000° F. and 2100° F. compared with a NiCoCrAlY having a nominal composition, by weight, of 31–33% Ni, 20–22% Cr, 7–9% Al, 0.035–0.065% Y, with the balance Co and incidental impurities. The abradable portion of the present invention was judged to be comparable based on visual observation. Such NiCoCrAlY alloy is considered to have good oxidation resistance. In addition, such surface portion was screened in a cyclic thermal fatigue test between 2000° F. and water quench for 30 cycles. Metallurgical evaluation detected no cracks. Based on testing, the abradable surface of the article of the present invention possesses the characteristics of an excellent high pressure turbine shroud seal material.

The present invention, through the mixture of the high temperature and low temperature range alloys, provides the capability of obtaining an approximately 100% dense material without pressure being applied during furnace processing. This is accomplished through the selection of the compositions of the powders of the mixture and the processing temperature. A unique characteristic of the method of the present invention is the use of liquid phase sintering rather than providing a presintered structure.

According to the method of the present invention, the high temperature and low temperature allow powders, which are manufactured using well known commercial techniques, are blended, with the first or higher temperature melting powder consisting of 50–70 wt% of the mixture. Preferably, the powder size is in the range of about −140, +325 mesh size, although other sizes may be used for particular applications. Such blend is cold compacted at a compacting temperature to provide a rigid preform. Presintering in a non-oxidizing environment can be performed at a presintering temperature below the solidus of the lower melting range alloy to improve preform integrity. The thickness of the preform is selected as a function of the final desired deposit or material, and has up to an 80% apparent density dependent on powder size and pressure used during compacting. The preferred range for the final abradable surface is from 0.05 to about 0.2 inch. For example, if the final desired product or article surface portion is to be in the range of 0.06–0.08″, approximately about 0.1″ thick cold compact or rigid preform is desired.

Such preform first is placed on a clean suface of a backing member or article, for example a turbine shroud. Then it is exposed to a high temperature non-oxidizing condition such as a vacuum furnace cycle, generally at a processing temperature less than about 2400° F. and less than the incipient melting temperature of the backing member or article. The preform can be held in place on the article surface by any convenient means such as tack welding, gravity, etc. The article is heated to the processing temperature in the range above the liquidus of the low temperature melting component but below the liquidus of the higher melting powder of the mixture. This causes the lower melting component in the preform to melt and wet the powder particles of the higher melting alloy, thereby consolidating the preform and attaching it to the article surface. Additional time at the processing temperature promotes interdiffusion of the powder particles and homogenity in the powder mixture, as well as a bond with the substrate of the article. In addition, the processing results in a major increase in the remelt temperature of the powdered mixture. This effect is illustrated in the data of Tables III and IV. The result is a product with an apparent density of at least about 99%, approaching 100%. Generally the furnace or processing temperature is held at least about 50° C. above the liquidus temperature of the lower melting component of the mixture. Accordingly, it is desirable to keep the liquidus of the low melting temperature component of the mixture low to maintain a low processing temperature. However, the processing temperature is below the liquidus of the higher melting powder and below the incipient melting temperature of the backing member or article. In addition, the mixture of the two powdered alloys is selected such that the solidus of the final abradable surface portion of the article is above surface's intended operating temperature.

After holding the material in the vacuum furnace at the processing temperature for a time sufficient to achieve the desired interdiffusion of the powder particles, the product is cooled and then can be machined to a final desired configuration. Accordingly, the size of the initial cold compact is selected, taking into consideration that reduction in size through liquid phase sintering, to provide excess material sufficient to be removed such as by machining to provide the final configuration.

In another form of the present invention, the lower melting alloy of the MCrAlSi type, possesses several attributes which make it useful as a brazing alloy for nickel- and cobalt-base superalloy articles. This alloy effectively wets such superalloys, essential for brazing alloys. Its melting range is in a useful temperature range. More importantly, alloys of the MCrAlSi family of alloys of this form of the present invention exhibit corrosion and oxidation resistance far superior to that found in many commonly used brazing alloys.

The mixture of the present invention can be used in the repair of an article which has a damaged or defective outer portion. In such a method of repair, at least the damaged or defective portion is removed such as by mechanical, chemical, electrical, etc. means well known in the turbine shroud repair art to provide a repair receiving surface.

A mixture of the two powders of the present invention is selected as a replacement powder mixture so that a replacement outer portion will have a solidus above the incipient melting temperature of the article, for example the Ni-base or Co-base superalloy of a turbine shroud. The mixture then is disposed on the repair receiving surface.

Disposition of the mixture on such surface can be accomplished in a variety of ways. One way is to provide a preform as previously described. Such a preform can be as a relatively thick shape or as a tape or relatively thin shaped preform, herein called a tape, as is well known in the art. Also, the mixture can be bonded with a slurry such as using an acrylic type binder as an example of a binder which can decompose upon heating leaving substantially no residue. These methods of binding are well known and widely used in the art.

After the replacement mixture, in whatever form, is disposed on the repair receiving surface, the mixture is heated, as described above, in a non-oxidizing atmosphere at a processing temperature above the liquidus temperature of the second powdered alloy and below the liquidus temperature of the first powdered alloy of the replacement mixture. Then the mixture and the repair receiving surface are held at the processing temperature to liquid phase sinter the powder mixture, to interdiffuse the powders and to bond the replacement mixture to the repair receiving surface.

The drawing presents graphically the results of hot rub comparison tests, conducted at 2000 F, in air. The data have been normalized to 0.020 inch incursion, to represent the behavior of various combinations of gas turbine shroud material and gas turbine blade tip treatment under similar test conditions.

As was discussed, gas turbine engine operation includes, particularly in the turbine section, the close relative movement of turbine blade tips with a surrounding shroud, under high temperature conditions. Other relative rotating, potentially interfering conditions exist in such apparatus. In the evaluation of potential materials and systems for use in such applications, hot rub tests have often been used to simulate the wear that occurs when a turbine blade rubs against a shroud. These tests are conducted under standardized laboratory conditions, and thereby provide a means for meaningful comparison of wear behavior among various combinations of shroud material and blade tip treatment.

In these tests, several flat specimens of the blade material are affixed (in radial orientation) to the periphery of a wheel, which is caused to rotate at the speed necessary to achieve the desired tip speed. A curved specimen representing the shroud is supported in a position such that the spinning blade specimens nearly contact the shroud specimen. During the test, the blade specimens and shroud specimens are forcibly brought together, resulting in removal of material from the tips of the blade specimens, from the curved surface of the shroud specimen, or from both. Under some conditions, transfer of material from the blade specimens to the shroud specimen can occur.

The drawing is a bar chart which represents the results of a series of hot rub tests in which the behavior of shrouds embodying the present invention were compared with shrouds made with other materials or systems. The effects of blade tip treatment on rub behavior are also illustrated. The test conditions employed in these tests were: temperature—2000° F.; blade tip speed—1400 ft/sec; incursion rate—0.002 inch/sec; atmosphere—air. All results have been normalized to 0.020 inch total incursion, to facilitate comparison.

Each cluster of bars represents the behavior of a particular shroud material. The first cluster, at the left of the drawing, represents the behavior of shrouds made by the method of the present invention. The other clusters depict the behavior of shrouds made by other methods: respectively vacuum plasma sprayed (VPS) CoNiCrAlY metallic coating having a nominal composition by weight of 31-33% Ni, 20-22% Cr, 7-9% Al, 0.035-0.065% Y, balance Co and incidental impurities; solid cast nickel-base superalloy, sometimes referred to as N-5 alloy; and yttria-stabilized zirconia coating deposited using apparatus commercially available from Union Carbide Co. and known as D-Gun apparatus. Within each cluster there are groups of one or two bars to illustrate the effect of different blade tip treatments on rub behavior. The tip treatments employed in these tests included bare blades; cubic boron nitride particles, commercially available as BORAZON material, secured by nickel plating; and tantalum carbide particles in a NiCoCrAlY matrix. In this manner of presenting the data, the amount of shroud wear (open bars) and the amount of blade tip wear (shaded bars) must necessarily total 0.020 inch, the normalized amount of incursion. For those tests where blade material was transferred to the shroud, forming what is sometimes called a shroud scab, the difference between the amount of blade tip wear (shaded bars) and the thickness of the shroud scab (cross-hatched bars) must necessarily be 0.020 inch. Within the context of performance of aircraft gas turbine engines, shroud wear is preferred to blade wear, and shroud scabbing is the least desirable condition. Note that in all tests involving uncoated or bare specimen tips and known shroud specimens, a significant amount of scabbing occurred. Removal of some shroud material, and no scabbing, was observed in tests on speciments embodying the present invention. Where the specimen tips had been treated with coatings incorporating Borazon particles or tantalum carbide particles, at least half of the wear occurred on the shroud specimen. Therefore, the present invention provides a significant improvement and a margin of safety against the possibility that coatings might be removed in service. In addition, the present invention facilitates use of blade tips without coatings.

The present invention has been described in connection with specific examples and embodiments. However, it will be understood by those skilled in the art that the invention is capable of other variations and modifications without departing from its scope as represented by the appended claims.

What is claimed is:

1. In a method of making an article having an environmentally resistant, abradable surface portion, the steps of:
   (a) providing a powder mixture of two powdered alloys each having a base of elements M, Cr and Al in which M is the least one element selected from the group consisting of Co and Ni, the mixture having a total mixture composition consisting essentially of, by weight, 10-35% Cr, 4-10% Al, from a small but effective amount up to about 0.09% Y, 2-6% Si with the balance M and incidental impurities, and further characterized by the substantial absence of B;
   a first of the powdered alloys having a solidus and a liquidus, consisting of 50-70 wt% of the mixture and having a melting range higher than a second of the powdered alloys;
   the first alloy characterized by the substantial absence of Si and the presence of Y in an amount, up to 0.15 wt.%, which will provide the Y content in the total mixture composition;
   the second of the powdered alloys having a solidus and a liquidus, consisting essentially of the balance of the mixture, being characterized by the substantial absence of Y, and consisting essentially of, by weight, 8-12% Si, 1.5-4% Al, 10-30% Cr, with the balance M and incidental impurities;

(b) compacting the mixture at a compacting temperature below the solidus of the second of the powdered alloys to provide a preform;

(c) disposing the preform on a surface of the article;

(d) heating the preform and surface in a non-oxidizing atmosphere at a processing temperature above the liquidus temperature of the second powdered alloy and below the liquidus temperature of the first powdered alloy of the mixture; and (e) holding the preform and surface at the processing temperature for a time sufficient to liquid phase sinter the powder mixture, to interdiffuse elements of the first and second powders, and to bond the preform to the article surface.

2. The method of claim 1 in which the powder mixture is provided to generate a preform after compacting, and in which the processing temperature is in the range of 980°–1100° C.

3. The method of claim 1 in which, after compacting the mixture to provide a preform and before disposing the preform on the surface, the preform is presintered in a non-oxidizing atmosphere at a presintering temperature below the solidus of the second of the powdered alloys.

4. In a method of repairing an outer portion of an article comprising the steps of:

removing at least part of the outer portion of the article to provide a repair receiving surface;

selecting from the powder mixture of claim 1 a replacement powder mixture which will provide a replacement outer portion having a solidus above the incipient melting temperature of the article;

disposing the replacement powder mixture on the repair receiving surface;

heating the replacement mixture and repair receiving surface in a non-oxidizing atmosphere at a processing temperature above the liquidus temperature of the second powdered alloy and below the liquidus temperature of the first powdered alloy of the mixture; and holding the replacement mixture and repair receiving surface at the processing temperature for a time sufficient to liquid phase sinter the powder mixture, to interdiffuse elements of the first and second powders, and to bond the replacement mixture to the repair receiving surface.

5. The method of claim 4 in which the replacement powder mixture is compacted at a compacting temperature below the solidus of the second of the powdered alloys to provide a preform, prior to disposing the replacement mixture on the repair receiving surface.

6. The method on claim 4 in which the replacement powder mixture is preliminarily bonded together into tape form with a bonding mixture which decomposes without substantial residue at the processing temperature.

7. The method of claim 2 wherein the thickness of the preform after compacting the powder mixture is about 0.1".

8. In a method of making an article having an inner portion of a superalloy selected from a group consisting of Co-base and Ni-base superalloys and having an incipient melting temperature, and an environmentally resistant, abradable outer portion metallurgically bonded with the inner portion, the outer portion consolidated and liquid phase sintered from a powder mixture of two powdered alloys each comprising a base of elements M, Cr and Al in which M is at least one element selected from a group consisting of Co and Ni, the mixture having a total mixture composition consisting essentially of, by weight, 10–35% Cr, 4–10% Al, from a small but effective amount up to about 0.09% Y, 2–6% Si with the balance M and incidental impurities, and further characterized by the substantial absence of B, a first of said powdered alloys consisting of 50–70 wt% of said powdered mixture characterized by the substantial absence of Si and the presence of Y in an amount, up to 0.15 wt.%, which will provide the Y content in the total mixture composition having a solidus and a liquidus, and having a melting range higher than a second of said powdered alloys, a second of said powdered alloys, consisting essentially of the balance of said mixture, being characterized by the substantial absence of Y, and consisting essentially of, by weight, 8–12% Si, 1.5–4% Al, 10–30% Cr, with the balance M and incidental impurities, the steps of:

compacting the powder mixture of the outer portion at a compacting temperature below the solidus of the second of the powdered alloys to provide a preform;

disposing the preform on a surface of the inner portion;

heating the preform and surface in a non-oxidizing atmosphere at a processing temperature above the liquidus temperature of the second powdered alloy and below the liquidus temperature of the first powdered alloy of the mixture; and holding the preform and the surface at the processing temperature for a time sufficient to liquid phase sinter the powder mixture, to interdiffuse elements of the first and second powders, and to bond the preform to the surface of the inner portion.

9. The method of claim 8 in which the article formed is a turbine shroud.

10. The method of claim 8 in which the processing temperature is at least about 50° C. above the liquidus of the second powdered alloy and below the incipient melting temperature of the inner portion of the article.

11. The method of claim 8 wherein the outer portion of the article has a thickness of at least about 0.05".

* * * * *